(12) United States Patent
Ozugur et al.

(10) Patent No.: US 7,299,046 B1
(45) Date of Patent: Nov. 20, 2007

(54) APPARATUS, AND ASSOCIATED METHOD, FOR FACILITATING DORMANT-MODE OPERATION OF A MOBILE MODE IN A RADIO COMMUNICATION SYSTEM

(75) Inventors: Timucin Ozugur, Garland, TX (US); Behcet Sarikaya, Plano, TX (US)

(73) Assignee: Alcatel Lucent, Paris (FR)

( * ) Notice: Subject to any disclaimer, the term of this patent is extended or adjusted under 35 U.S.C. 154(b) by 502 days.

(21) Appl. No.: 10/231,984

(22) Filed: Aug. 30, 2002

(51) Int. Cl.
*H04Q 7/20* (2006.01)

(52) U.S. Cl. .................. 455/439; 455/436; 455/442; 455/437; 455/426.1; 370/331; 370/401; 370/328; 370/338; 370/335

(58) Field of Classification Search ............... 455/466, 455/355, 557, 556.1, 433, 436, 437, 426.1; 370/466, 328, 352, 401, 338, 331, 335
See application file for complete search history.

(56) References Cited

U.S. PATENT DOCUMENTS 6,826,407 B1 * 11/2004 Helferich .................. 455/466
6,842,462 B1 * 1/2005 Ramjee et al. ............. 370/466
2004/0105413 A1 * 6/2004 Menon et al. .............. 370/338
2004/0204071 A1 * 10/2004 Bahl et al. ................. 455/557

FOREIGN PATENT DOCUMENTS

FR   WO03105380 A1 * 12/2003

OTHER PUBLICATIONS

Faccin et al., Dormant Mode Handover Support in Mobile Networks, Sep. 17, 2001, All.*

* cited by examiner

*Primary Examiner*—Joseph Feild
*Assistant Examiner*—Randy Peaches
(74) *Attorney, Agent, or Firm*—Robert H. Kelly; Bobby D. Slaton; Jessica W. Smith (57) ABSTRACT

Apparatus, and an associated method, for facilitating registration of a mobile node with a home agent. Dormant mode operation of the mobile node is supported. Message generators positioned at the mobile node generate appropriate messages for a UMTS and a WLAN network. The messages include indicia identifying the home agent associated with the mobile node. Apparatus positioned at separate network portions of the communication system form registration proxies for performing the registration of the mobile node with the home agent.

17 Claims, 4 Drawing Sheets

APPARATUS, AND ASSOCIATED METHOD, FOR FACILITATING DORMANT-MODE OPERATION OF A MOBILE MODE IN A RADIO COMMUNICATION SYSTEM

The present invention relates generally to communications in a radio communication system having separate network parts operable pursuant to separate operating protocols, such as separate network parts operable pursuant to a UMTS (Universal Mobile Telephone Service) protocol and pursuant to a WLAN (Wireless Local Area Network) protocol. More particularly, the present invention relates to apparatus, and an associated method, by which to facilitate dormant-mode roaming operations of a mobile node between the separate network parts, thereby to provide dormant-mode operation support for inter-technology roaming.

Network-based registration proxies are used for the registration of the mobile-node IP, or other, address with a home agent. Thereby, signaling required of the mobile node is reduced. And, the mobile node is permitted to be in the dormant mode while the registration proxies perform the registration operations. Signaling overhead at the air interface is reduced and power consumption of the mobile node is also reduced. And, when the registration procedures are carried out by way of a UMTS network part, the need otherwise to use a bandwidth-consumptive GTP tunnel is obviated.

BACKGROUND OF THE INVENTION

Communication systems operate to effectuate the communication of data. Advancements in communication technologies have permitted the implementation of communication systems capable of communicating data at increased data communication rates and also in manners to facilitate recovery of the informational content thereof subsequent to its communication upon a non-ideal communication channel.

Radio communication systems are emblematic of communication systems that have incorporated advancements in communication technologies and are permitting of use to effectuate high data rate communication services. Radio communication systems differ from their wireline counterparts in that communication channels upon which data is communicated are defined upon radio links formed of portions of the electromagnetic spectrum. Wireline connections interconnecting communication stations are obviated.

Many varied types of radio communication systems have been developed and implemented for general, and other, communication services. Cellular communication systems are examplementary of radio communication systems that have been implemented and that have achieved significant levels of consumer penetration, i.e., usage.

Cellular communication systems, historically, have been used primarily to effectuate circuit-switched voice communications as well as, on occasion, to effectuate low-band width data communication services.

The technological advancements in communication technologies have been applied to cellular communication systems to permit a technical, migration path of cellular technology through successive generations of communication system technologies. First-generation systems generally refer to cellular communication systems that utilize analog communication techniques. Second-generation (2G) cellular communication systems refer, generally, to systems that utilize digital communication techniques. So-called 2.5 G communication systems refer, generally, to digital cellular communication systems that provide for variable bit rate communications and for the creation of alternate paths upon which to communicate packet-switched data in core networks defined in such systems. And, third-generation (3G) communication systems refer, generally, to systems that further support larger band-width communication service applications and support quality of service (QoS) provisioning.

Various different, and sometimes competing, 3G systems are undergoing development for future implementation. And, global harmonization efforts are ongoing. The third generation partnership project (3GPP) is standardizing various of the 3 G communication systems, such as the WCDMA (Wideband Code-Division Multiple Access) system, the EDGE (Enhanced Data for GSM Evolution) system, and the TD-SCDMA (Time-Division Space-Code-Division Multiple Access) system. And, a GSM/GPRS (General System for Mobile Communications/General Packet Radio Service), a 2.5G system, is presently undergoing implementation.

Cellular communication systems are generally public-access systems in that members of the general public are permitted to communicate therethrough pursuant to a service subscription to the communication system.

Other radio communication systems have analogously also benefited from, or have been made possible, as a result of advancements in communication technologies. For instance, WLANs (Wireless Local Area Networks) have been made possible as a result of advancements in communication technologies. While initially implemented generally as private systems, increasingly, public wireless communications are extending into WLAN environments. WLANs permit high data rate communication services to be effectuated therethrough. And, effectuation of such high data rate communication services are generally more desirably implemented by way of a WLAN, when available, than through a cellular communication system. WLANs are constructed, for instance, to be operable pursuant to an IEEE 802.11 operating specification.

A mobile node can be constructed to permit its operation, i.e., communication, in the WLAN or a cellular communication system, such as the GPRS (General Packet Radio Service) network. The separate systems are, as noted, operable pursuant to separate technologies. Dual-mode operational capability is required of such a mobile node. Data communication services, such as communication services that communicate IP (Internet Protocol)—formatted data are able to be effectuated by either of the GPRS network and the WLAN.

Proposals have been set forth to permit roaming of a mobile node between technologies, i.e., between the UMTS system and the WLAN. However, existing proposals do not adequately provide support for dormant mode operation of a mobile node when the mobile node roams between the inter-technology, i.e., the UMTS and the WLAN.

Accordingly, a manner by which to provide support for dormant mode operation when a mobile node roams between inter-technologies, such as between a UMTS and a WLAN, would be advantageous.

It is in light of this background information related to high data rate communication services that the significant improvements of the present invention have evolved.

SUMMARY OF THE INVENTION

The present invention, accordingly, advantageously provides apparatus, and an associated method, by which to facilitate communications in a radio communication system having separate network parts operable pursuant to separate operating protocols, such as separate network parts operable pursuant to a UMTS (Universal Mobile Telephone Service) protocol and pursuant to a WLAN (Wireless Local Area Network) protocol.

Through operation of an embodiment of the present invention, a manner is provided by which to facilitate dormant-mode roaming operations of a mobile node between the separate network parts. Thereby, dormant-mode operational support is provided for inter-technology roaming. The mobile node is selectably capable of communicating pursuant to a first operating protocol of a first technology and pursuant to a second operating protocol of a second technology.

When the mobile node roams between the separate network parts, mobile node operation procedures are reduced relative to conventional procedures. The mobile node is able to be in a dormant mode when, conventionally, otherwise the mobile node would need to remain in a more power-consumptive mode.

Instead, network-based registration proxies are used for the registration of the mobile node IP, or other, address with a home agent. Signaling required of the mobile node is reduced. And, the mobile node is permitted to be in the dormant mode while the registration proxies perform the registration operations. Signaling overhead at the air interface is reduced, and power consumption required of the mobile node to effectuate such registration is also reduced. And, when the registration procedures are carried out by way of a UMTS network part, the need to use a bandwidth-consumptive GTP tunnel is obviated.

In one aspect of the present invention, apparatus is provided for an access point, or other network part, of a WLAN. A detector is positioned to detect an association request message generated by the mobile node. The association request message is formatted pursuant to the operating protocol of the WLAN, such as an operating protocol set forth in an IEEE 802.11 operating specification. The association request message is modified, however, to include an IP, or other, address of a home agent associated with the mobile node. That is to say, the home agent, IP, or other, address is inserted into the association message generated by the mobile node and detected at the detector embodied at the access point, or other network part. The apparatus embodied at the network part of the WLAN operates as a registration proxy to register the mobile node IP, or other, address with the home agent associated with the mobile node.

In another aspect of the present invention, the network part of the WLAN maintains a table in which the identity of the mobile node, such as by its IP address, is indexed together with the IP, or other address associated therewith. And, the apparatus embodied at the access point, or other network part, of the WLAN includes a message generator for generating messages to effectuate the registration with the home agent associated with the mobile node. And, the generator also selectably generates messages for communication with a PMAP (Paging Mobility Anchor Point) to permit the mobile node subsequently to be paged pursuant to a high data rate communication service.

Through operation of an embodiment of the present invention, when a mobile node roams from the UMTS part of the network to the WLAN, the mobile node need only associate with an access point of the WLAN. Then, the mobile IPv4, or other appropriate, registration is turned off at the mobile node. And, the mobile node enters, or re-enters, a dormant mode. The access point thereafter operates as a mobile IPv4, or other, registration proxy to register the mobile node with its home agent, on behalf of the mobile node.

In another aspect of the present invention, apparatus is provided for the network part of the UMTS. The network part of the UMTS is coupled to receive a registration message, such as a location update, message generated by the mobile node. The message is formatted according to the operating protocol of the UMTS, but modified to include the IP, or other, address of the home agent associated with the mobile node. The message is delivered to a GGSN (Gateway GPRS Service Node) by way of an SGSN (Serving GPRS Service Node). The HLR (Home Location Register) associated with the mobile node maintains a table indexing the home agent address associated with the mobile node indexed together with the identity of the mobile node. And, the GGSN, or other, network part of the UMTS includes a message generator for generating messages to register the IP address of the mobile node with the home agent associated with the mobile node.

Thereby, when a dormant mobile node roams from a WLAN to the UMTS, the mobile node performs merely a location update in the UMTS. The mobile node IP, or other, registration is turned off at the mobile node. And, the mobile node enters, or re-enters, the dormant mode. The GGSN, and other network elements, act as a mobile node IP, or other, registration proxy to register the mobile node with the home agent associated with the mobile node on the behalf of the mobile node. The conventional need otherwise to utilize a GTP tunnel is obviated.

In these and other aspects, therefore, apparatus, and an associated method for a radio communication system is disclosed. The radio communication system has a network including a first part operable pursuant to a first operating protocol and a second part operable pursuant to a second operating protocol. The radio communication system has a mobile node selectably operable pursuant to each of the first and second operating protocol. And, the mobile node is selectably operable in a dormant mode. Efficient delivery of identifying indicia to a home agent associated with the mobile node is facilitated. A network-positioned detector detects a mobile-node generated message. The network-positioned detector detects a mobile-node generated message. The mobile-node generated message is generated pursuant to a mobile-node-selected one of the first operating protocol and the second operating protocol. The mobile-node-generated message includes an identifier, identifying the identifying indicia of the mobile node. A network-positioned identifying indicia generator is coupled to the network-positioned detector. The network-positioned identifying indicia generator is operable responsive to detection at the network-positioned detector of the mobile-node generated message. And, the generator effectuates the delivery of the identifying indicia to the home agent associated with the mobile node. The delivery of the identifying indicia is effectuated by the network-positioned identifying indicia generator made free of mobile-node interaction, thereby permitting operation of the mobile node in the dormant mode during the delivery of the identify indicia to the home agent.

A more complete description of the present invention and the scope thereof can be obtained from the accompanying drawings that are briefly summarized below, the following detailed description of the presently-preferred embodiments of the invention, and the appended claims.

DETAILED DESCRIPTION

Figure 1:
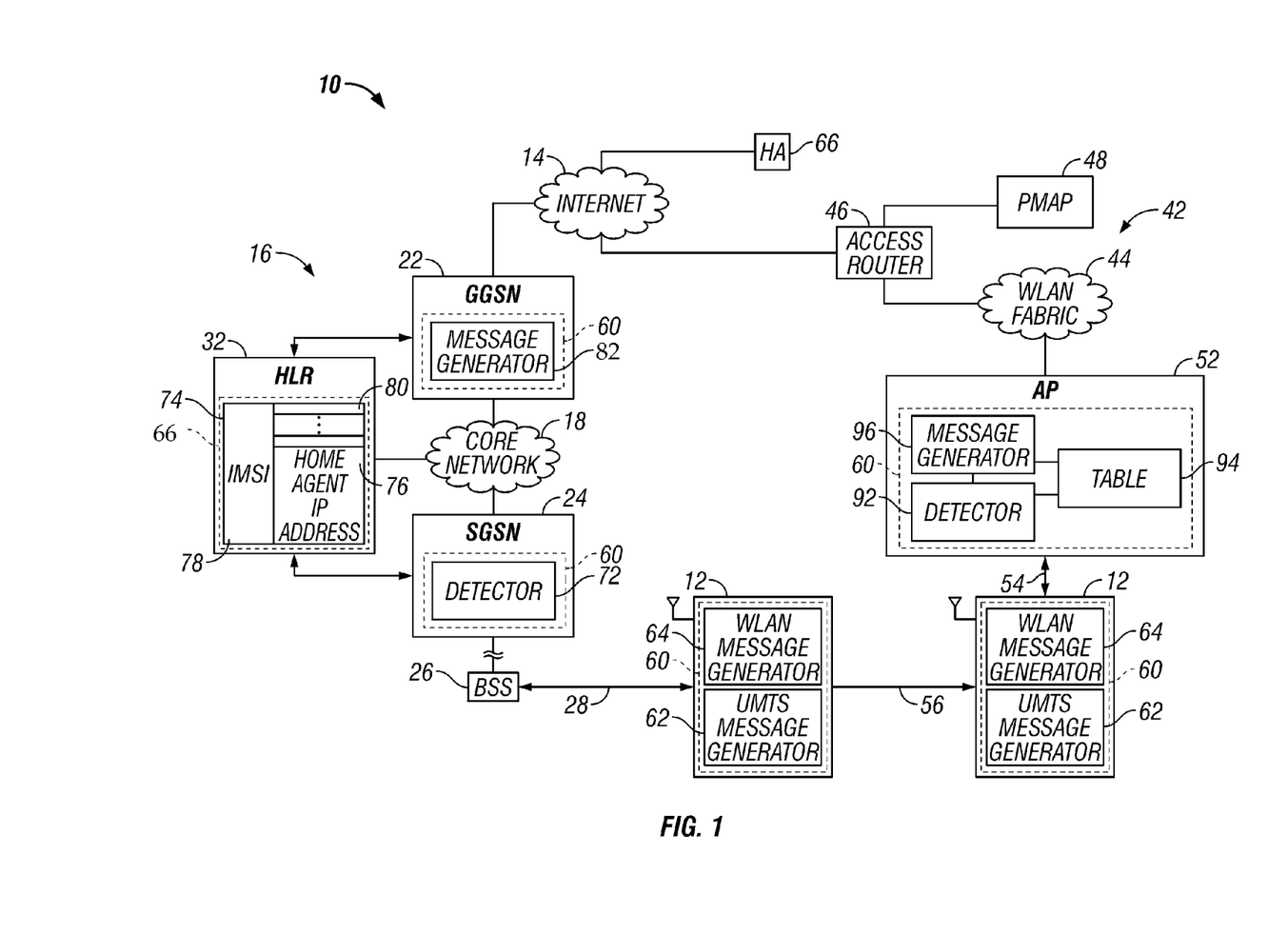
FIG. 1 illustrates a functional block diagram of a radio communication system that includes an embodiment of the present invention as a portion thereof.

Referring first to FIG. 1, a radio communication system, shown generally at 10, provides for radio communications with mobile nodes, of which the mobile nodes 12 is representative. The mobile node forms a multi-mode device, capable of operation pursuant to a first operating protocol and a second operating protocol.

In the exemplary implementation, the mobile node is selectably operable to communicate pursuant to the operating protocol of a UMTS (Universal Mobile Telephone Service) system, here a GPRS (General Packet Radio Service) system, or variant thereof, and a WLAN operable pursuant to an IEEE 802.11 standard, or a variant thereof.

The radio communication system also includes a network part including a first part operable pursuant to a GPRS operating specification, or other UMTS-like specification and a second portion forming a WLAN operable pursuant to an IEEE 802.11 operating specification, or a variant thereof. In other implementations, the radio communication system is operable pursuant to other sets of operating protocols. And, while the following description shall describe operation of an embodiment of the present invention with respect to its implementation in the exemplary communication system having parts formed of a UMTS and a WLAN, the teachings of the present invention are analogously also implementable in communication systems formed of other parts, operable pursuant to other operating protocols.

The network of the radio communication system is here shown to include an internet backbone 14, here permitting IP-formatted (Internet Protocol-formatted) data to be communicated therethrough. Data sources (not shown), such as computer servers are connectable to the internet backbone.

A first network portion of the network part of the radio communication system here forms a cellular communication network operable pursuant to a GSM/GPRS (General System for Mobile Communications/General Packet Radio Service) operating specification that provides for high data rate communication services. The first portion of the network part is indicated generally at 16. The first portion includes a core network 18 of the GSM/GPRS system to which a GGSN (Gateway GPRS Service Node) 22 and an SGSN (Serving GPRS Service Node) are coupled. The SGSN, in turn, is coupled to a base station system (BSS) 26 formed, for example, of a base transceiver station and a base station controller. The base transceiver station of the base station system transceives radio signals with the mobile node upon radio channels defined upon radio links, here designated by the arrow 28. Radio communications are effectuated with the mobile node generally pursuant to the GSM/GPRS operational specifications. The first portion also is shown to include an HLR (Home Location Register) 32 that forms the home location register of the mobile node 12.

The second portion of the network part of the radio communication system forms a WLAN, here designated generally at 42. The second portion includes a WLAN fabric 44 to which an access router 46 is coupled. And, in turn, the access router is coupled to the internet backbone. A PMAP (Paging Mobility Anchor Point) 48 is functionally coupled to, or forms part of, the access router. And, an access point 52 is coupled to the WLAN fabric. The access point forms a radio transceiver capable of transceiving radio signals with the mobile node when the mobile node roams into an area encompassed by the second portion forming the WLAN. The radio signals are communicated upon radio channels defined upon radio links, here designated by the arrow 54.

The arrow 56 is representative of roaming movement of the mobile station, and the mobile station 12 is representative of the positioning of the mobile station within an area encompassed by an access point, here the access point 52 of the WLAN forming the second portion of the network part of the radio communication system. Due to the dual-mode capability of the mobile node, the mobile node is selectably operable pursuant to the operating protocol of the UMTS and pursuant to the operating protocol of the WLAN.

The mobile node 12 includes apparatus 60 of an embodiment of the present invention. The elements of the apparatus 60, positioned at the mobile node, as well as elsewhere in the radio communication system, are functionally represented. And, such functional elements can be implemented in any desired manner. Here, the apparatus 60 formed at the mobile node includes a UMTS message generator 62 and a WLAN message generator 64. The UMTS message generator operates to generate a registration message, such as a location update message for communication to the first portion 16 of the network part of the radio communication system. The message generated by the message generator 62 includes the IP address of a home agent, here designated at 66, associated with the mobile node. The message is otherwise generated at times, and in manners, set forth in the operating standard of the GSM/GPRS operating specification, or other UMTS system. And, the WLAN message generator 64 operates to generate a message for communication to the second portion 42 of the network part of the communication system. The message generated by the generator 64 includes the IP address of the home agent 66 and forms, for example, an attach message formatted pursuant to the IEEE 802.11, or other appropriate, operating protocol.

The first portion 16 of the network part of the radio communication system includes further apparatus 60 of an embodiment of the present invention. Here, again, the elements of the apparatus 60 are functionally represented and can be implemented in any desired manner. Additionally, the elements of the apparatus embodied at the first portion 16 are here shown to be distributed throughout the first portion 16. In other implementations, the elements of the apparatus embodied at the first portion 16 are physically embodied at other locations at the first portion 16, or elsewhere in the network part of the radio communication system.

Here, the first portion 16 includes a UMTS message detector 72, formed at the SGSN 24. The detector 72 operates to detect the value of the home agent IP address contained in the UMTS message generated by the generator 62 embodied at the mobile node. The value of the address, detected by the detector is provided by the SGSN to the home location register 32. The home location register includes a table 74 that also forms a portion of the apparatus 60 of an embodiment of the present invention. The table includes a field 76 populated with a value of the IP address of the home agent indexed together with the identity of the mobile node, here an IMSI value 78 of the mobile node. Other fields 80, regularly contained at the HLR, are also shown to form portions of the table 74. The GGSN 22 includes a message generator 82 that also forms a portion of the apparatus 60 of an embodiment of the present invention. The message generator 82 operates a registration message for communication to the home agent 66. The address of the home agent to which the message generated by the message generator is directed is retrieved from the table 74 contained at the HLR.

The second portion 42 of the network part of the radio communication system also includes apparatus 60 of a further embodiment of the present invention. Here, again, the elements of the apparatus are functionally represented and can be implemented in any desired manner. In the exemplary implementation, the functional elements of the apparatus 60 formed at the second portion 42 of the network part are embodied at an access point 52. In other implementations, the elements of the apparatus 60 can be embodied elsewhere. The apparatus 60 includes a detector 92 operable to detect the home agent IP address contained in the message generated by the WLAN message generator 64 embodied at the mobile node. The apparatus further includes a table 94 at which the identity of the home agent associated with the mobile node is indexed together with the identity of the mobile node. And, the apparatus includes a generator 96, operable to generate a registration message for communication to the home agent 66 identified in the table 94 to be associated with the mobile node. Upon generation of the messages by either the message generator 62 or 64, the mobile node can be placed in a dormant mode. Subsequent registration procedures are performed by apparatus 60 at a respective portion 16 or 42 of the network part of the communication system. Support for roaming operations and inter technology operation is thereby provided.

Figure 2:
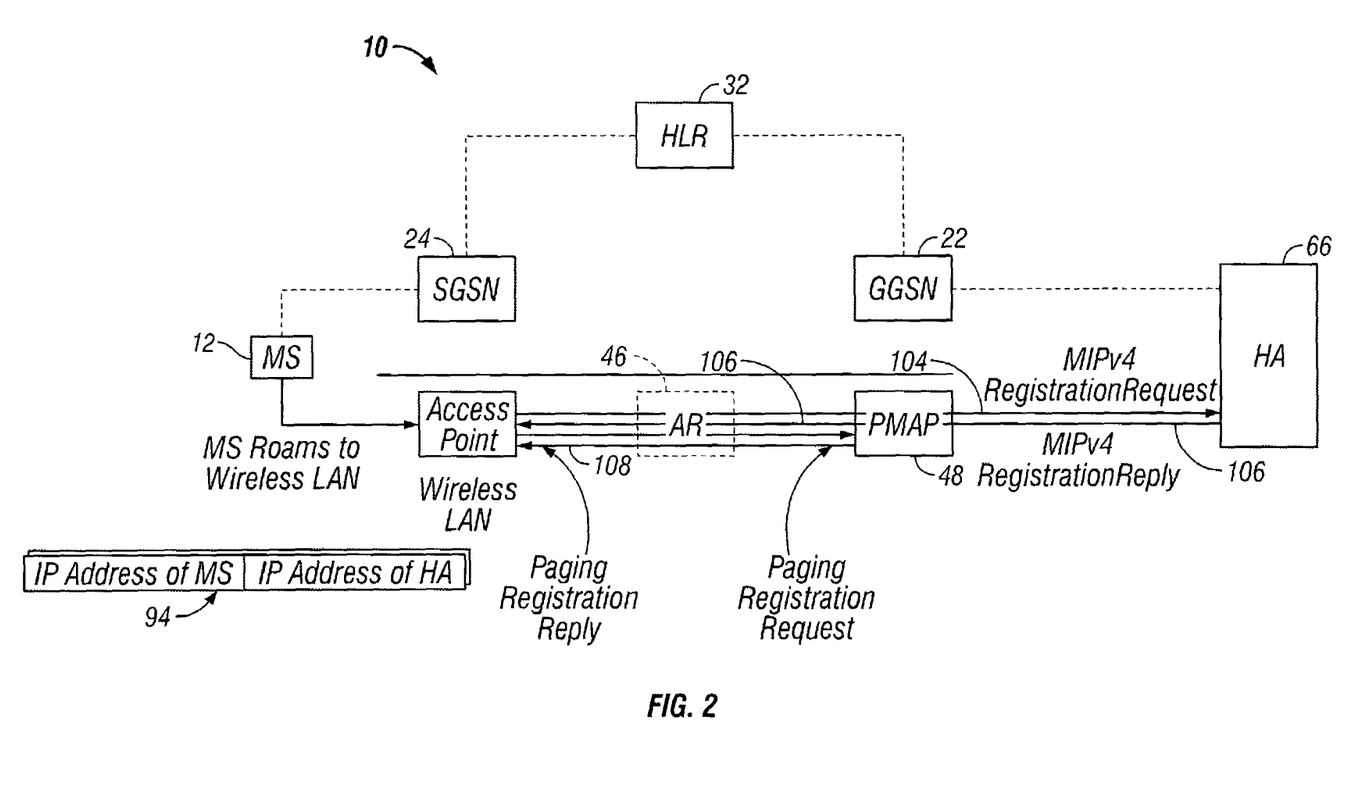
FIG. 2 illustrates a functional block diagram representative of operation of an embodiment of the present invention by which a network part of the WLAN portion of the radio communication system shown in FIG. 1 forms a registration proxy for a mobile node.

FIG. 2 illustrates functional representations of various of the elements of the radio communication system 10 shown in FIG. 1. The GGSN 22, SGSN 24, and HLR 32 of the first network portion of the radio communication system are also shown in the figure. And, the access point 52, access router 46, and PMAP 48 of the second portion of the network part also are shown in the figure. Operation of the apparatus 60 embodied at the second network portion by which to register the mobile node 12 with the home agent 66 is represented in the figure.

When the mobile node 12 roams into an area encompassed by the WLAN, i.e., the area encompassed by an access point 52 of the second portion of the network part of the communication system, the mobile node detects the availability of communications by way of the WLAN through detection of beacon signals generated by the access points of the WLAN. The mobile node associates with the access point 52 by generating the message by the WLAN message generator 64 (shown in FIG. 1). The attachment message is indicated in the figure by the arrow 102. The mobile node also informs the access point that the mobile node shall be in a power-save mode, i.e., a dormant mode. Then, the mobile node enters the dormant mode. Thereafter, the access point, and the apparatus 60 embodied thereat, is responsible for effectuating various actions. Namely, the access point operates to send an MIPv 4 registration request message to the home agent. Generate of the message indicated in the figure by the segment 104. The access point also operates to receive an MIPv 4 registration reply message generated by the home agent. Such message is indicated in the figure by the segment 106. The access point also operates to generate and send a paging cache binding message to a mobility anchor point, referred to herein as the Paging Mobility Anchor Point (PMAP) 48. And, the access point also operates to receive a paging cache binding reply message generated by the PMAP. Generation of such message is indicated by the segment 108.

By providing the access point with the apparatus 60 of an embodiment of the present invention, responsibility is given to the access point for the MIPv 4 registration and paging binding on behalf of the mobile node. Thereby, the dormant mode operation of the mobile node is supported. The mobile node IPv 4 registration is turned-off at the mobile node terminal. And, the mobile node is responsible only pursuant to the basic WLAN procedure, i.e., to become associated with the access point 52. The association procedures set forth in the IEEE 802.11 is extended to encompass the IP address of the home agent 66. When the mobile node associates with the access point, the IP address of the home agent is inserted into the association message. The access point acts as a proxy to perform the MIPv 4 registration for the mobile node. As the proxy, the access point keeps the IP address of the mobile node at the table 94. And, the access point maps the IP address of the home agent to the IP address of the mobile node, as indicated in the table, to permit the mobile IP registration to be performed on behalf of the mobile node. In the event of an unsuccessful attempt to locate the mobile node, the access point informs the home agent. Unsuccessful attempts to locate the mobile node may occur, e.g., when data arrives while the mobile node is roaming but there is not enough time for the UMTS to register the mobile node with the home agent.

Figure 3:
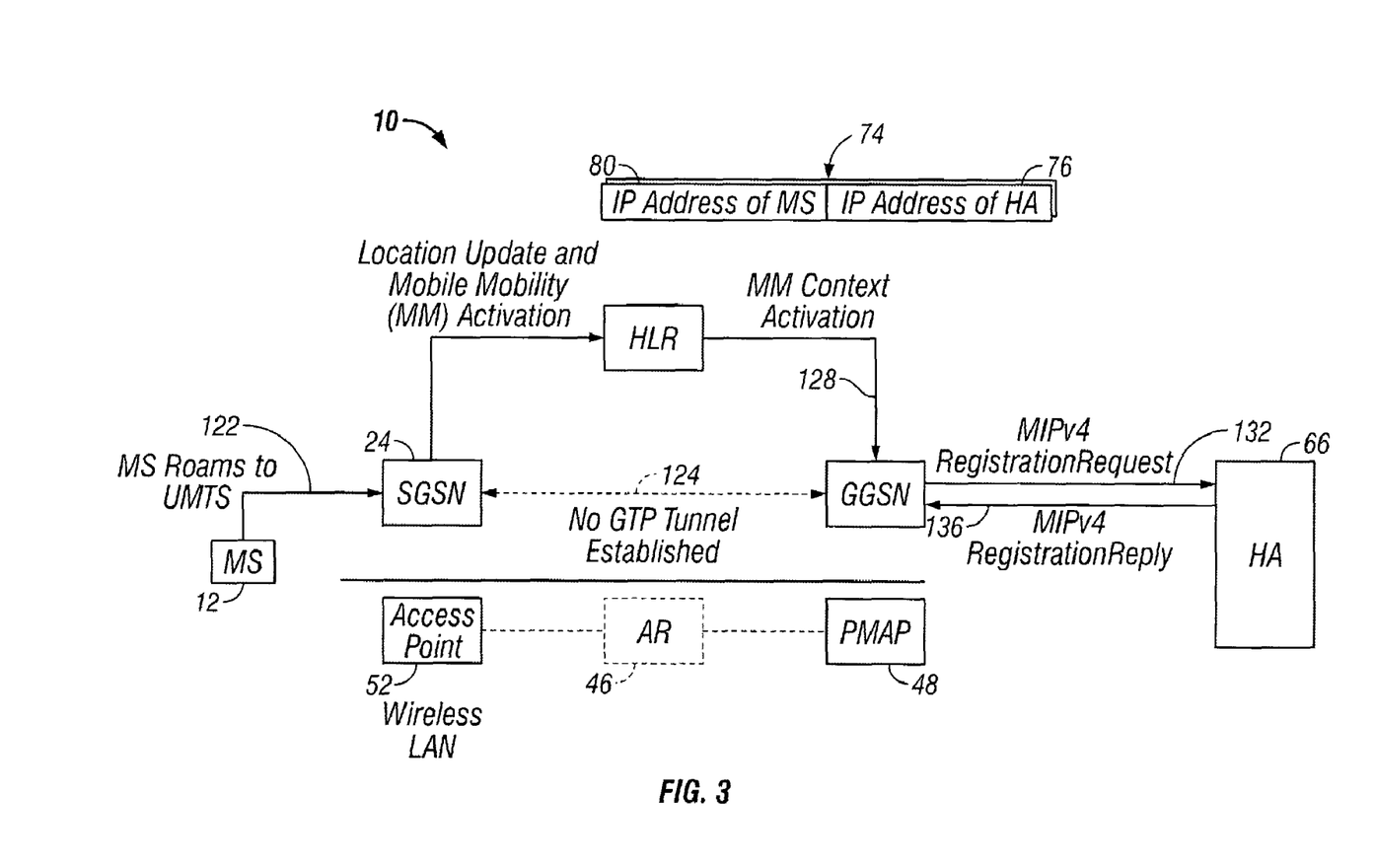
FIG. 3 illustrates a functional block diagram, similar to that shown in FIG. 2, but here representative of operation of an embodiment of the present invention by which a network part of the UMTS portion of the radio communication system shown in FIG. 1 forms a registration proxy for the mobile node.

FIG. 3 also illustrates various elements of the first and second portions of the network part of the radio communication system. Here, operation of the apparatus 60 embodied at the first portion of the network part is represented. Elements shown in the figure are commonly-referenced with the elements shown previously, and described with respect to FIG. 1.

When the mobile node roams from the WLAN into the UMTS, the mobile node is not required to become disassociated with the access point 52 of the WLAN. When the mobile node roams into the UMTS, the mobile node performs a location update with the SGSN 24. The location update is a GPRS attach procedure. Pursuant to the location update, a message generated by the message generator 62 (shown in FIG. 1) is generated. Communication of the message is indicated in the figure by the segment 122. Responsive thereto, the SGSN activates the location information and a Mobile Mobility (MM) context in the home location register. The MM context is a flag maintained at the HLR defined in the specification associated with GPRS. Upon generation of the location update message, the mobile node enters the dormant mode. A GTP tunnel, conventionally required to be formed between the SGSN and GGSN designated in the figure by segment 124, is obviated. And, the mobile node does not perform MTPv 4 registration procedures. Instead, the home location register generates the MM activation of the mobile node 12 with the GGSN. Such activation is indicated in the figure by the segment 128. Then, the GGSN, here forming an MIPv 4 registration proxy, registers the mobile node with the home agent. The MIPv4 registration request message is indicated in the figure by the segment 132. And, the GGSN also receives the MIPv 4 registration request and reply handshake, indicated in the figure by the segment 136.

By giving the responsibility to the GGSN to perform the MIPv 4 registration on behalf of the mobile node, dormant mode operation of the mobile node is supported. And, the mobile Ipv 4 registration is turned off at the mobile node. The mobile node is responsive merely for the basic UMTS location registration with the SGSN and the SGSN with the HLR. In order to support roaming to the WLAN, the UMTS location registration is extended to cover the home agent IP address. When the mobile node updates its location with the SGSN the mobile node inserts the home agent IP address into the location update message. And, the SGSN forwards the IP address of the home agent to the HLR. The HLR maps the IP address of the home agent to the IP address of each mobile node, indicated by field 76 and 80 of the table 74.

When the mobile node is operated pursuant to the UMTS, a GPRS attach procedure is made to the SGSN when the mobile node is turned on in the GPRS mode. The mobile node provides its identity, i.e., the IMSI, and the attach type. The GPRS attach procedure forms, essentially, establishment of a Logical Link Control (LLC) layer between the mobile node and the SGSN. The LLC connection between the mobile node and the SGSN is an IMSI-base connection.

Figure 4:
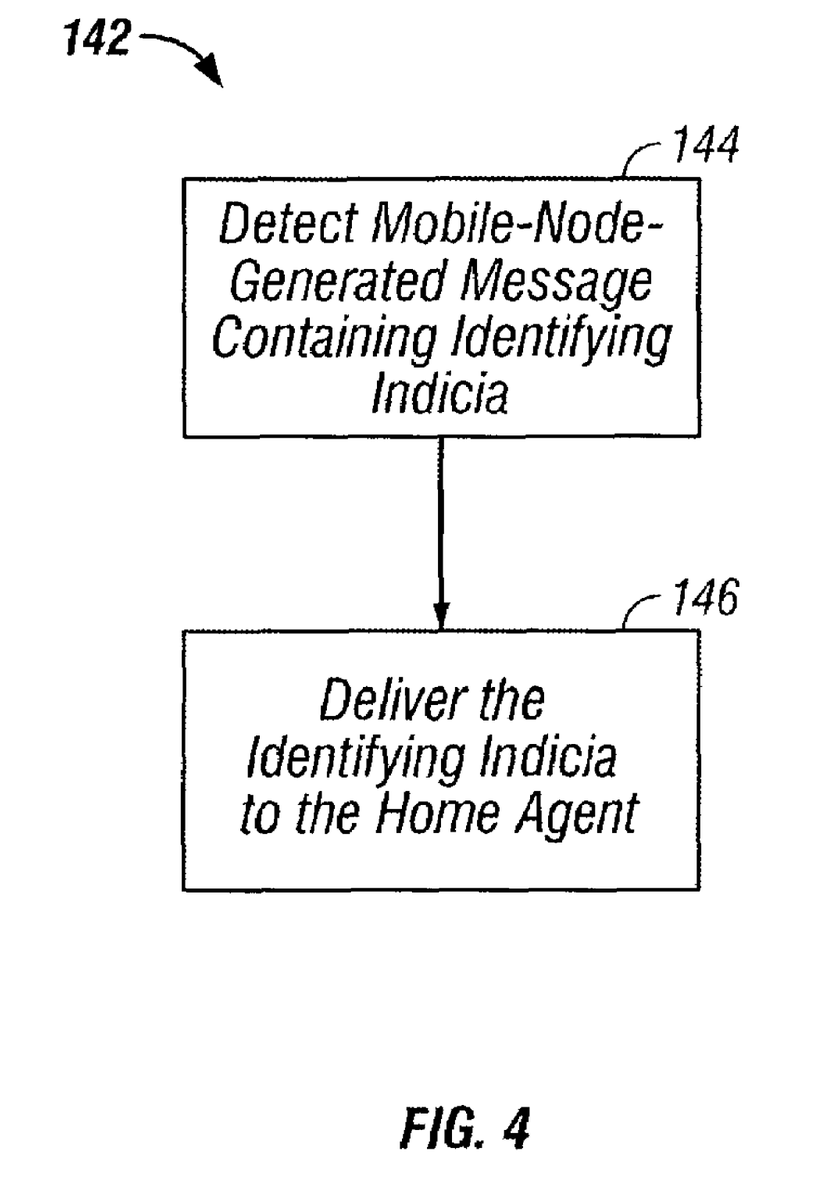
FIG. 4 illustrates a method flow diagram listing the method steps of the method of operation of an embodiment of the present invention.

FIG. 4 illustrates a method, shown generally at 142, of an embodiment of the present invention. The method facilitates sufficient delivery of identifying indicia to a home agent associated with the mobile node.

First, and as indicated by the block 144, a mobile node generated message is detected at the network of a radio communication system. The mobile node generated message is generated pursuant to a mobile node selected when of a first and second operating protocols. And, the message includes an identifier, identifying the identifying indicia of the mobile node.

Then, and as indicated by the block 146, the identifying indicia is delivered to the home agent associated with mobile node. The delivery of the identifying indicia is effectuated free of further interaction by the mobile node, thereby permitting the mobile node to be in the dormant mode during delivery of the identifying indicia to the home agent.

Thereby, manner is provided by which to support roaming operations of a mobile node operable in a UMTS and a WLAN, or other set, of operating systems.

The previous descriptions are of preferred examples for implementing the invention, and the scope of the invention should not necessarily be limited by this description. The scope of the present invention is defined by the following claims:

The invention claimed is:

1. In a radio communication system having a network including a first part operable pursuant to a first operating protocol and a second part operable pursuant to a second operating protocol, and the radio communication system having a mobile node selectably operable pursuant to each of the first and second operating protocols, respectively, and the mobile node selectably operable in a dormant mode, an improvement of apparatus for facilitating efficient delivery of identifying indicia to a home agent associated with the mobile node, said apparatus comprising:
    a network-positioned detector for detecting a mobile-node generated message, the mobile-node generated message generated pursuant to a mobile-node selected one of the first operating protocol and the second operating protocol and the mobile-node generated message including an identifier, identifying the identifying indicia of the mobile node; and
    a network-positioned identifying indicia generator coupled to said network-positioned detector, said network-positioned identifying indicia generator, operable responsive to detection at the network-positioned detector of the mobile-node generated message, for effectuating the delivery of the identifying indicia to the home agent associated with the mobile node, the delivery of the identifying indicia effectuated by said network-positioned identifying indicia generator mode free of mobile node interaction, thereby permitting operation of the mobile node in the dormant mode during the delivery of the identifying indicia to the home agent, wherein the second part of the network operable pursuant to the second operating protocol comprises a Wireless Local Area Network (WLAN) and wherein the mobile-node-generated message that said network-positioned detector detects comprises an association request message, and wherein the Wireless Local Area Network further comprises a Paging Mobility Anchor Point (PMAP) and wherein said network-positioned identifying-indicia generator further effectuates the delivery of the identifying indicia to the Paging Mobility Anchor Point.

2. The apparatus of claim 1 wherein the Wireless Local Area Network (WLAN) comprises an Access Point (AP) and wherein said network positioned detector is embodied at the Access Point.

3. The apparatus of claim 2 wherein said network-positioned identifying-indicia generator is further embodied at the access point.

4. The apparatus of claim 1 further comprising a network-positioned information map containing values of the identifier included in the mobile-node-generated message indexed together with values of a data-protocol assignation address assigned to the mobile node, the assignation address assigned to the mobile node by the home agent responsive to delivery thereto of the identifying indicia by said network-positioned identifying-indicia generator.

5. The apparatus of claim 4 wherein the radio communication system provides for IP-formatted (Internet Protocol-formatted) data services, and wherein the assignation address assigned to the mobile node comprises an IP-address.

6. The apparatus of claim 4 wherein the identifier, identifying the identifying indicia of the mobile node comprises a first identifier defining the mobile node and a second identifier defining the home agent associated with the mobile node and wherein said network-positioned information maps indexes both of the first identifier and the second identifier together with the data-protocol assignation address.

7. The apparatus of claim 4 wherein the Wireless Local Area Network (WLAN) comprises and Access Point (AP) and wherein said network-positioned information map is embodied at the Access Point.

8. In the communication system of claim 1, a further improvement of apparatus for the mobile node, said apparatus comprising:
    an association request message generator for generating the association request message detectable by said message-positioning detector, the association request message containing the identifying indicia.

9. The apparatus of claim 1 wherein the first part of the network operable pursuant to the first operating protocol comprises a cellular communication network operable pursuant to a cellular data-communication protocol, and wherein the mobile-node-generated message that said network-positioned detector detects comprises location registration message.

10. The apparatus of claim 9 wherein the cellular communication network comprises an SGSN (Serving GPRS Service Node) and wherein said network-positioned detector is embodied at the SGSN.

11. The apparatus of claim 10 wherein said network-positioned identifying-indicia generator is further embodied at the SGSN.

12. The apparatus of claim 10 wherein the cellular communication network further comprises a location register associated with the mobile node, the location register coupled to the SGSN, and wherein said apparatus further comprises a network-positioned information map containing values contained in the attached requested message indexed together with values of an address identifying the home agent associated with the mobile node, the address associated with the home address associated to the mobile node contained in the attach request message.

13. In the communication system of claim 12, a further improvement of apparatus comprising:
   a location registration message generator for generating the location registration message detectable by said message position detector, the location registration message containing the identifying indicia.

14. An apparatus for facilitating efficient delivery of identifying indicia to a home agent associated with the mobile node in a radio communication system having a network including a first part operable pursuant to a first operating protocol and a second part operable pursuant to a second operating protocol, and the radio communication system having a mobile node selectably operable pursuant to each of the first and second operating protocols, respectively, and the mobile node selectably operable in a dormant mode, said apparatus comprising:
   a network-positioned detector for detecting a mobile-node generated message, the mobile-node generated message generated pursuant to a mobile-node selected one of the first operating protocol and the second operating protocol and the mobile-node generated message including an identifier, identifying the identifying indicia of the mobile node, wherein the first operating protocol is a UMTS (Universal Mobile Telephone Service) protocol and the second operating protocol is a WLAN (Wireless Local Area Network); and
   a network-positioned identifying indicia generator coupled with a cellular GGSN node (Gateway GPRS Service Node) for effectuating the delivery of the identifying indicia to the home agent associated with the mobile node, the delivery of the identifying indicia effectuated by said network-positioned identifying indicia generator is free of mobile node interaction without activating conventional GPRS tunnels to deliver network-positioned identifying indicia, which requires mobile node to be awaken from dormant mode, thereby permitting operation of the mobile node in the dormant mode during the delivery of the identifying indicia to the home agent.

15. The apparatus of claim 14, wherein the WLAN comprises a Paging Mobility Anchor Point (PMAP) and wherein said network-positioned identifying-indicia generator is further enabled to effectuate the delivery of the identifying indicia to the Paging Mobility Anchor Point for enabling the mobile node to be paged.

16. A method for dormant-mode operation of a roaming mobile node in a radio communication system having a network including a first part operable pursuant to a first operating protocol and a second part operable pursuant to a second operating protocol, and the mobile node selectably operable pursuant to each of the first and second operating protocols, respectively, and the mobile node selectably operable in a dormant mode, said method comprising:
   detecting a mobile-node generated message indicating roaming of the mobile node, the mobile-node generated message generated pursuant to a mobile-node selected one of the first operating protocol and the second operating protocol and the mobile-node generated message including an identifier, identifying the identifying indicia of the mobile node, wherein the first operating protocol is a UMTS (Universal Mobile Telephone Service) protocol and the second operating protocol is a WLAN (Wireless Local Area Network); and
   delivering the identifying indicia to the home agent associated with the mobile node, the delivery of the identifying indicia effectuated by a network-positioned identifying indicia generator free of mobile node interaction, without activating conventional GPRS tunnels to deliver network-positioned identifying indicia, thereby permitting operation of the mobile node in the dormant mode during the delivery of the identifying indicia to the home agent.

17. The method of claim 16, wherein the WLAN comprises a Paging Mobility Anchor Point (PMAP) and wherein said network-positioned identifying-indicia generator is further enabled to effectuate the delivery of the identifying indicia to the Paging Mobility Anchor Point for enabling the mobile node to be paged.

* * * * *